United States Patent
Larkins et al.

(10) Patent No.: US 9,094,452 B2
(45) Date of Patent: Jul. 28, 2015

(54) METHOD AND APPARATUS FOR LOCATING PHISHING KITS

(75) Inventors: Joshua Enoch Larkins, Birmingham, AL (US); Jeffrey Chatfield Laughton, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 425 days.

(21) Appl. No.: 13/618,558

(22) Filed: Sep. 14, 2012

(65) Prior Publication Data

US 2014/0040227 A1    Feb. 6, 2014

Related U.S. Application Data

(60) Provisional application No. 61/678,456, filed on Aug. 1, 2012.

(51) Int. Cl.
*G06F 21/00* (2013.01)
*H04L 29/06* (2006.01)

(52) U.S. Cl.
CPC ................................. *H04L 63/1483* (2013.01)

(58) Field of Classification Search
CPC ...................................................... G06F 21/00
USPC ........................................................... 726/25
See application file for complete search history.

(56) References Cited

U.S. PATENT DOCUMENTS

| | | | |
|---|---|---|---|
| 7,831,522 B1 | 11/2010 | Satish et al. | |
| 8,191,140 B2 | 5/2012 | Cohen et al. | |
| 8,332,947 B1 * | 12/2012 | Bregman et al. | 726/25 |
| 8,381,292 B1 * | 2/2013 | Warner et al. | 726/22 |
| 2003/0187661 A1 * | 10/2003 | Warren et al. | 704/277 |
| 2005/0086161 A1 | 4/2005 | Gallant | |
| 2007/0192855 A1 * | 8/2007 | Hulten et al. | 726/22 |
| 2008/0235103 A1 * | 9/2008 | Baccas et al. | 705/26 |
| 2008/0294399 A1 * | 11/2008 | Comair | 703/6 |
| 2009/0077383 A1 * | 3/2009 | de Monseignat et al. | 713/175 |
| 2009/0228780 A1 | 9/2009 | McGeehan | |
| 2010/0077483 A1 | 3/2010 | Stolfo et al. | |
| 2011/0219448 A1 * | 9/2011 | Sreedharan et al. | 726/23 |

(Continued)

FOREIGN PATENT DOCUMENTS

| | | |
|---|---|---|
| EP | 1683293 A1 | 7/2006 |
| EP | 2611106 A1 | 7/2013 |
| WO | 2006092785 A2 | 9/2006 |

(Continued)

OTHER PUBLICATIONS

Wardman et al., "Identifying Vulnerable WEbsites by Analysis of Common Strings in Phishing URLs", 2009, IEEE.*
Badra et al., "Phishing Attacks and Solutions", Mobimedia 07, 2007.*

*Primary Examiner* — William Powers
(74) *Attorney, Agent, or Firm* — Banner & Witcoff, Ltd.; Michael A. Springs

(57) ABSTRACT

A system and method for locating phishing kits on the internet is disclosed herein. The system is configured to perform a method comprising storing phishing kit file names and file host names into a database, navigating to a search engine, searching the file hosts stored in the database for the phishing kit file names stored in the database, saving URLs where the phishing kit file names are located on the internet into the database, and displaying URLs where the phishing kit file names are located as results.

21 Claims, 2 Drawing Sheets

(56) References Cited

U.S. PATENT DOCUMENTS

2012/0084866 A1  4/2012  Stolfo
2014/0046891 A1* 2/2014  Banas .......................... 706/46

FOREIGN PATENT DOCUMENTS

| WO | 2007143059 A2 | 12/2007 |
| WO | 2009055785 A2 | 4/2009 |

* cited by examiner

METHOD AND APPARATUS FOR LOCATING PHISHING KITS

FIELD

The disclosure herein relates generally to searching for and eliminating phishing kits on the internet. More specifically, the disclosure herein provides a method and apparatus for identifying phishing kits on file hosting websites such that the proprietor of the file hosting website can be contacted, and the phishing kits can be removed.

BACKGROUND

Often criminals operate phishing scams to steal personal information, such as usernames, passwords, addresses, credit card information, and ultimately money by disguising themselves as a trustworthy entity. Criminals often lure victims to fake websites by electronic correspondence seemingly from financial institutions, social websites, auction websites, online payment processors, or IT administrators. Victims may receive emails with links to fake webpages, which appear to be authentic. These fake webpages typically request the victim to verify information by entering personal information into various information requests on the website. In this way, the user will believe that a legitimate source requested this information, and the user will enter the requested information onto the fake webpage. The criminal can then steal this information and can, for example, access the user's credit card and steal money from the victim.

Phishing kits are often freely available on the internet and are easy to set up and deploy. Phish kit files are generally located on free file hosts on the internet that are freely accessible to any user, such that anyone with internet access can easily obtain the kit files and launch a phishing website. These files typically contain the necessary tools to deploy a phishing site, such as HTML, PHP, cascading style sheets, java script, and accompanying images. Unfortunately, this also means that amateur phishers and would-be criminals have easy access to phishing kits. Once the would-be criminal has access to these files, it is very easy to implement the phishing website as the would-be criminal can simply extract the files and launch the phishing website.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure herein relate to making it more difficult for would-be criminals to obtain phishing kits by locating the kits on the internet and attempting to remove them from the internet.

In an exemplary embodiment an apparatus comprising: a processor; and a memory for storing computer readable instructions for locating phishing kits on the internet is disclosed. The computer readable instructions are configured to be executed by the processor to cause the computer to perform the method steps in the exemplary embodiments described herein.

In another exemplary embodiment disclosed herein, a system and method for locating phishing kits on the internet is disclosed. The system is configured to perform a method comprising storing file names and file host names into a database, navigating to a search engine, searching the file hosts stored in the database for the file names stored in the database, saving URLs where the file names are located on the internet into the database, and displaying URLs where the file names are located as results. The URLs are filtered before being displayed. The file names are names of phishing kit files. The processor is configured to search a plurality of file hosts for a plurality of the file names stored in the database simultaneously. The system and method are configured to search the file hosts stored in the database periodically.

In another exemplary embodiment, the searching of the file hosts stored in the database comprises entering the file host name and the file names into the search engine, and the entering of the file host name and the file names into the search engine is entered at a random speed. The random speed emulates a human entering a search query. If the searching results in multiple search results, the system is configured to browse each search result, and the system is configured to pause for a predetermined amount of time between viewing each search result.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
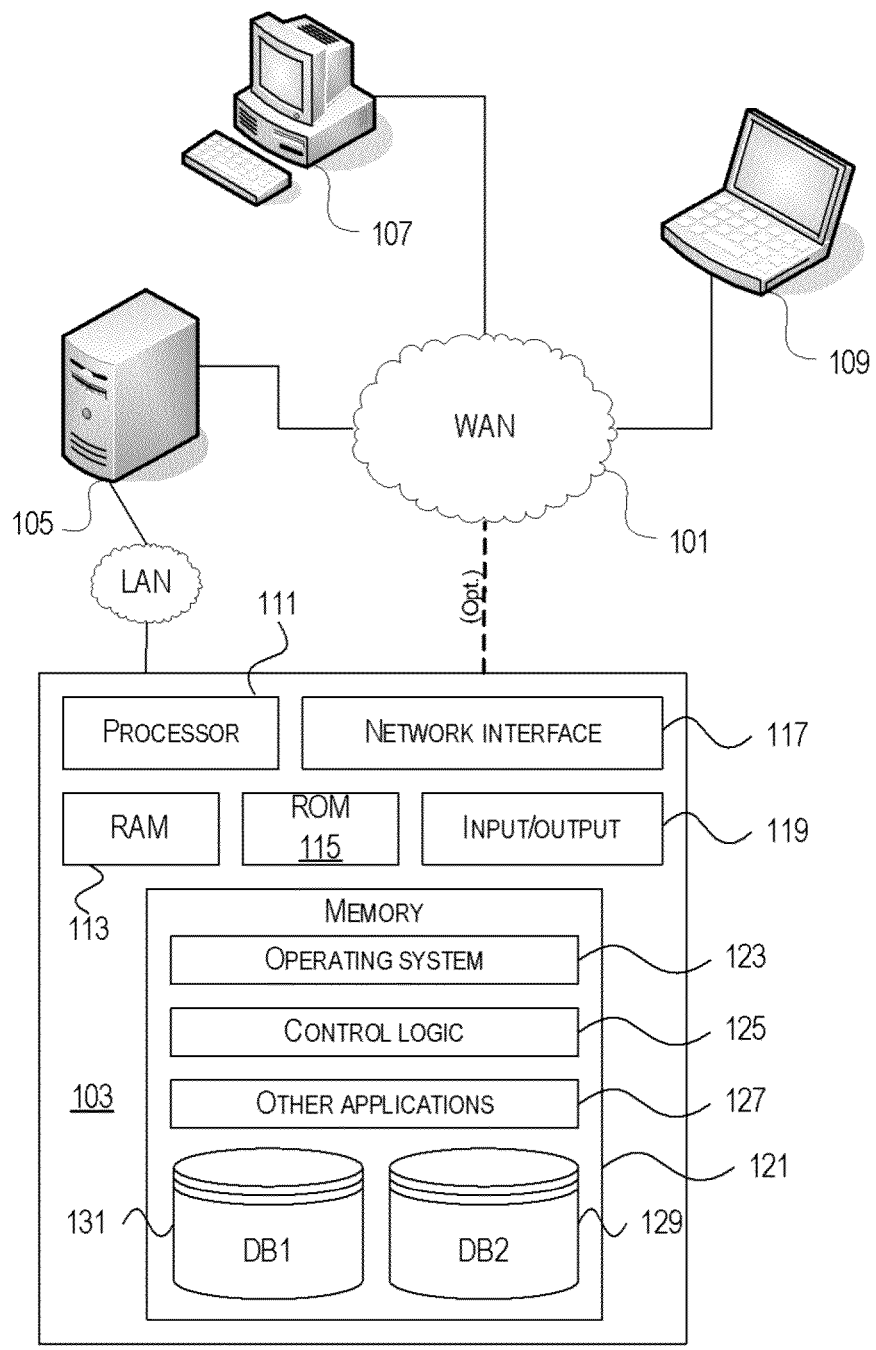
FIG. 1 illustrates one example of a network architecture and data processing device that may be used to implement one or more illustrative aspects of the invention.

FIG. 1 illustrates one example of a network architecture and data processing device that may be used to implement one or more illustrative aspects of the invention. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the invention as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, or printer), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the invention as described herein, and other application software 127 providing secondary, support, and/or other functionality which may or may not be used in conjunction with aspects of the present invention. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, or data updates).

Memory 121 may also store data used in performance of one or more aspects of the invention, including a first database 129 and a second database 131. In some embodiments, the first database may include the second database (e.g., as a separate table, or report). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS).

One or more aspects of the invention may be embodied in computer-usable or readable data and/or computer-executable instructions, such as in one or more program modules, executed by one or more computers or other devices as described herein. Generally, program modules include routines, programs, objects, components, or data structures. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, or RAM. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

A Cyber Phishing Kit Seeker System (CFKSS) is configured to detect and find phishing kits so that the file hosts can be notified to take the phishing kits down off of their websites. The CFKSS is configured to conduct various searches on the internet to locate phishing kit files. The CFKSS is configured to store the locations of the phishing kit files such that appropriate action can be taken to remove the files from the internet.

Figure 2:
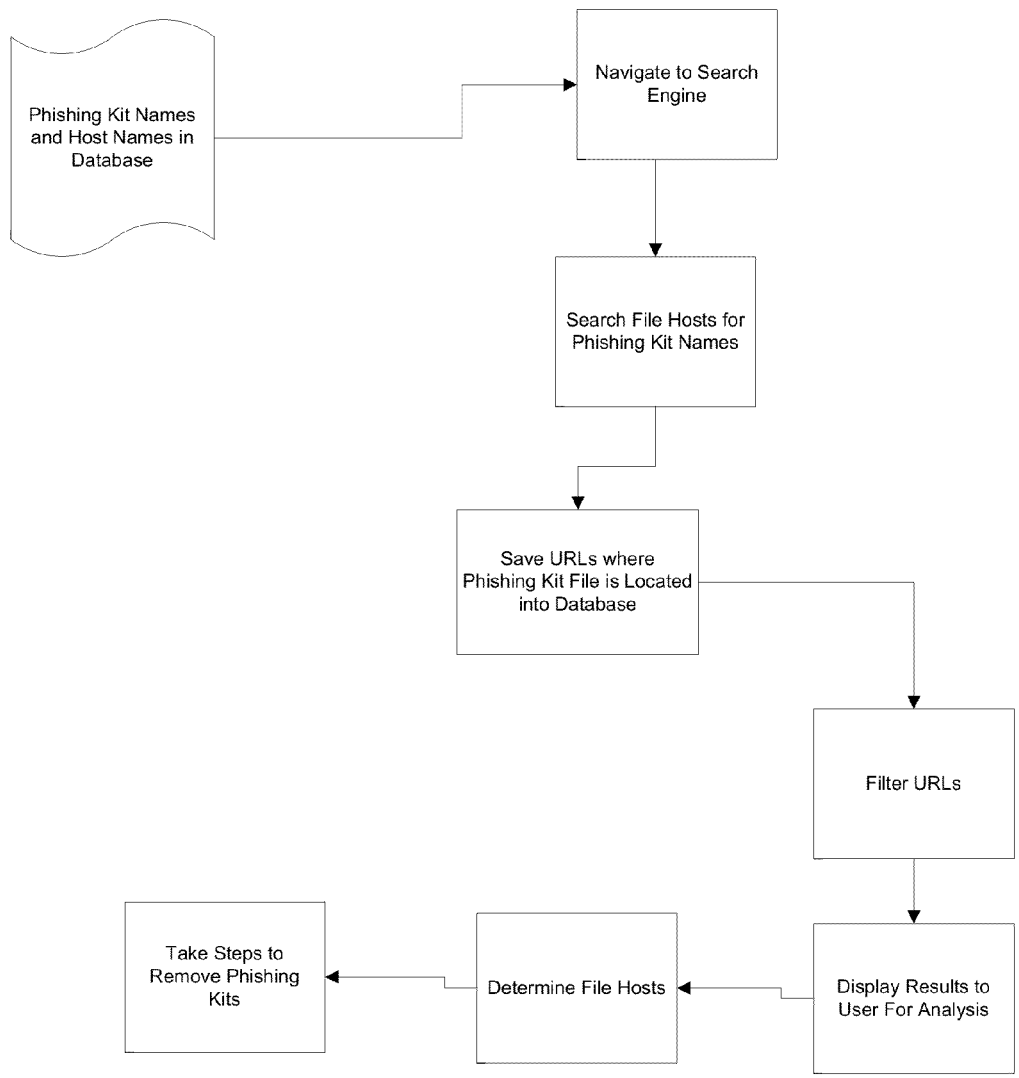
FIG. 2 illustrates a diagram of an exemplary process disclosed herein.

FIG. 2 depicts an exemplary process for searching for and detecting phishing kit files on the internet. A listing of phishing kit names targeting a certain institution is manually input into the CFKSS. Alternatively the CFKSS can obtain a listing of all known file names for phishing kits targeting certain institutions from a database. The CFKSS also stores a number of file hosts into a central database. The listing of phishing kit names and the file hosts can be periodically updated as new kits are discovered, created, or renamed and file hosts are created or closed.

The CFKSS loads a search engine in the browser. The CFKSS navigates to a search engine. The CFKSS can then search website specific file hosts for the particular phishing kit files. A typical method conducting this search is supported by many search engines and usually consists of composing a search string in the following manner: "site:domainname.com phishing kit filename.zip". In this way, the search engine restricts the result set to searching only within the specified domain name. Once the CFKSS finds a phishing kit file, it can be configured to save the particular URL where the phishing kit file is located. This search can be run periodically by the CFKSS. For example, if particular free file hosting websites have not been queried within a certain period of time, the CFKSS can be configured to update its search of these particular hosting sites. The period between searches can be anywhere from 24 hours to 1 week in one exemplary embodiment. The saved URLs containing the phishing kit files can then be tracked to a particular file host, and the entity maintaining the file hosts can be contacted to request removal of the phishing kit files from the file hosts.

Results can be gathered from the search engine by navigating result pages sequentially. All results are then stored in a database of suspicious URLs. Some of these URLs are then filtered out because they may be search results internal to the site. For example, a specific search engine may be used to search within a specified domain for the word "weather." Some valid results would be the domain's Weather page, but unwanted results would be those of searches returned to the search engine that simply link to a page of the domain's search results. Files can now be automatically retrieved from the identified URLs for analysis, or submitted to their respective hosts for removal.

Once these phishing kits are located on file sharing websites, the host of the website can be served with a cease and desist letter to try to get the phishing kit files removed. In extreme cases, the upstream provider can be contacted to terminate their internet presence. In cases of a host in hostile parts of the world, a request can be sent to the search engine to delist the link to the phishing kit. When these kits are found, it is also useful to retrieve the phishing kit for intelligence analysis regarding the attribution of the phishing kit and for taking further action against the individuals responsible for placing the phishing kit onto the file host.

In addition to searching specific file hosts, additional search types are also possible depending on what the search engine supports. For example, forums, blogs, the URLs themselves, or the title text of the resulting webpage can be searched for phishing kit files. Some search engines support an "inurl:" search, where the specified string must appear in the result URL itself or "intitle:" where the following string must appear in the title text of the resulting webpage.

To minimize detection from search engines or file hosts, appropriate measures are taken so that the application interacts with the internet browser in the same manner as a human would. For example, when a search request is entered into a search engine, each character is entered at a random speed between about 75 and 225 milliseconds, to emulate human typing speed. Additionally, when navigating between multiple search results pages, care is taken to pause up to 20 seconds, to emulate human behavior in browsing search results.

The CFKSS can be configured such that multiple programs can be run simultaneously. In this way, multiple applications of the CFKSS can be run and connected to the same central database. With multiple programs operating, each application would be scanning a unique file host simultaneously. Thus, for n multiples, the work would be completed n times faster.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An apparatus comprising:
a processor; and
a memory for storing computer readable instructions that, when executed by the processor, cause the apparatus to perform the steps of:
storing file names and file host names into a database;
navigating to a search engine;
utilizing the search engine to internally search the file host names stored in the database for the file names stored in the database;
saving URLs where the file names are located on the internet into a database;
filtering the URLs to obtain filtered URLs, wherein any URL that is internal to a file host is filtered out, wherein the file host is identified by at least one of the file host names; and
displaying the filtered URLs where the file names are located as results.

2. The apparatus of claim 1 wherein the file names are names of phishing kit files.

3. The apparatus of claim 1 wherein the processor is configured to search a plurality of file hosts for a plurality of file names stored in the database simultaneously.

4. The apparatus of claim 1 further comprising searching the file hosts stored in the database periodically.

5. The apparatus of claim 1 wherein searching the file hosts stored in the database comprises entering the file host name and the file names into the search engine and wherein entering the file host name and the file names into the search engine is entered at a random speed.

6. The apparatus of claim 5 wherein the random speed emulates a human entering a search query.

7. The apparatus of claim 1 wherein if the searching results in multiple search results, the processor is configured to browse each search result and wherein the processor is configured to pause for a predetermined amount of time between viewing each search result.

8. The apparatus of claim 7 wherein the pause for a predetermined amount of time emulates a human viewing each search result.

9. The apparatus of claim 1, wherein the apparatus is further configured to perform:
searching a different search type, wherein the different search type is different than a file host type.

10. The apparatus of claim 1, wherein the apparatus is further configured to perform:
initiating retrieval of a file for one of the filtered URLs.

11. The apparatus of claim 10, wherein a phishing kit comprises the file and wherein the apparatus is further configured to perform:
when the retrieval is successful, sending a request to the search engine to delist a link to the phishing kit.

12. The apparatus of claim 1, wherein one of the URLs is not internal to the file host and wherein the apparatus is further configured to perform:
initiating retrieval of a file from said one of the URL's.

13. A method comprising the steps of:
storing file names and file host names into a database by a processor;
navigating by a processor to a search engine;
utilizing the search engine to internally search by a processor the file host names stored in the database for the file names stored in the database;
saving by a processor URLs where the file names are located on the internet into a database;

filtering the URLs to obtain filtered URLs, wherein any URL that is internal to a file host is filtered out, wherein the file host is identified by at least one of the file host names; and displaying by a processor the filtered URLs where the file names are located as results.

14. The method of claim 13 wherein the file names are names of phishing kit files.

15. The method of claim 13 wherein the processor is configured to search a plurality of file hosts for a plurality of file names stored in the database simultaneously.

16. The method of claim 13 further comprising searching the file hosts stored in the database periodically.

17. The method claim 13 wherein searching the file hosts stored in the database comprises entering the file host name and the file names into the search engine and wherein entering the file host name and the file names into the search engine is entered at a random speed.

18. The method of claim 17 wherein the random speed emulates a human entering a search query.

19. The method of claim 13 wherein if the searching results in multiple search results, the processor is configured to browse each search result and wherein the processor is configured to pause for a predetermined amount of time between viewing each search result.

20. The method of claim 19 wherein the pause for a predetermined amount of time emulates a human viewing each search result.

21. A non-transitory computer-readable storage medium storing computer-executable instructions that, when executed, cause a processor to perform:

storing file names and file host names into a database by a processor;

navigating by a processor to a search engine;

utilizing the search engine to internally search by a processor the file host names stored in the database for the file names stored in the database;

saving by a processor URLs where the file names are located on the internet into a database;

filtering the URLs to obtain filtered URLs, wherein any URL that is internal to a file host is filtered out, wherein the file host is identified by at least one of the file host names; and initiating retrieval of a file from one of the filtered URLs.

* * * * *